United States Patent
Ueda et al.

(10) Patent No.: US 10,479,605 B2
(45) Date of Patent: Nov. 19, 2019

(54) ARTICLE STORAGE FACILITY

(71) Applicant: Daifuku Co., Ltd., Osaka-shi (JP)

(72) Inventors: Yuichi Ueda, Hinocho (JP); Masashige Iwata, Hinocho (JP); Hiroyuki Koide, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 35 days.

(21) Appl. No.: 16/012,904

(22) Filed: Jun. 20, 2018

(65) Prior Publication Data

US 2018/0370729 A1 Dec. 27, 2018

(30) Foreign Application Priority Data

Jun. 22, 2017 (JP) ................................. 2017-122546

(51) Int. Cl.
*G06F 7/00* (2006.01)
*B65G 1/137* (2006.01)

(52) U.S. Cl.
CPC ................................. *B65G 1/1376* (2013.01)

(58) Field of Classification Search
None
See application file for complete search history.

(56) References Cited

U.S. PATENT DOCUMENTS

| 5,927,926 | A  | * | 7/1999 | Yagi ..................... B65G 1/0435 414/274 |
| 10,247,257 | B2 | * | 4/2019 | Back ....................... F16D 23/06 |
| 2007/0059132 | A1 | * | 3/2007 | Akamatsu ............ B65G 1/0421 414/274 |
| 2008/0053941 | A1 | * | 3/2008 | Tsukamoto .......... B65G 1/0421 211/134 |

FOREIGN PATENT DOCUMENTS

| JP | 201157334 A | 3/2011 |
| JP | 20131510 A | 1/2013 |

* cited by examiner

*Primary Examiner* — Yolanda R Cumbess
(74) *Attorney, Agent, or Firm* — The Webb Law Firm

(57) ABSTRACT

A control apparatus monitors an amount of time that has elapsed since an article was stored at a first storage position or an amount of positional misalignment from a reference position of the article stored at the first storage position. This amount of time is a monitoring target amount, and the control apparatus monitors the monitoring target amount for each of multiple storage sections and causes a conveying apparatus to execute correction processing with a storage section in which the monitoring target amount has exceeded the set threshold as a target storage section. Correction processing is used for correcting the position of only the target article stored at a first storage position in a target storage section relative to a reference position.

7 Claims, 8 Drawing Sheets

ARTICLE STORAGE FACILITY

CROSS-REFERENCE TO RELATED APPLICATION

This application claims priority to Japanese Patent Application No. 2017-122546 filed Jun. 22, 2017, the disclosure of which is hereby incorporated in its entirety by reference.

BACKGROUND OF THE INVENTION

1. Field of the Invention

The present invention relates to an article storage facility.

2. Description of the Related Art

An article storage facility has been used which includes: a storage rack including multiple storage sections aligned along a conveying direction along a horizontal plane; a conveying apparatus for conveying an article to a storage section or from a storage section by moving in the conveying direction on a moving path along the front surface of the storage rack; and a control apparatus for controlling operations of the conveying apparatus. JP 2013-1510A (Patent Document 1) discloses an example of an article storage facility with this kind of configuration. Hereinafter, reference signs indicated in parentheses in the description of the background art are those of Patent Document 1.

As shown in FIGS. 1 and 2 in Patent Document 1, the article storage facility of Patent Document 1 includes: an article storage rack (50) including multiple article storage sections; a stacker crane (10) for conveying an article (B) to an article storage section or from an article storage section by moving on a work path (2) along a front surface of the article storage rack (50); and a control means (H) for controlling operation of the stacker crane (10). Also, with this article storage facility, when the operation mode of the stacker crane (10) is switched to an article position correction mode, the control means (H) causes the stacker crane (10) to execute article position correction processing for correcting the position of the article (B) to a correct placement position (50B). Specifically, the stacker crane (10) includes a transfer apparatus (30) that transfers the article (B) between itself (the stacker crane (10)) and the article storage rack (50), and in the article position correction processing, after the stacker crane (10) transfers the article (B) stored in the article storage section from the article storage section to the stacker crane (10), the position of the article (B) is corrected to the correct placement position (50B) by transferring the article (B) from the stacker crane (10) to the article storage section such that the article (B) is placed at the correct placement position (50B).

SUMMARY OF THE INVENTION

As described above, with the article storage facility of Patent Document 1, the position of the article stored in the storage section is corrected by re-doing the processing for transferring the article stored in the storage section from the conveying apparatus to the storage section. Incidentally, in the article storage facility, multiple articles are stored aligned in the depth direction of the rack in each storage section in some cases, and in such a case, it is thought that the processing for correcting the article position by re-doing the transfer processing is performed on each of the multiple articles aligned in the depth direction. However, if another article exists on the front side near the movement path of the conveying apparatus in the depth direction, in order to re-do the transfer processing on the article on the far side, which is opposite to the front side, it is necessary to perform additional processing for taking out the article on the front side from the storage section, temporarily moving it to another location (i.e., another storage section, etc.), and returning the article on the front side to the original storage section after the end of the re-doing of the transfer processing for the article on the far side. Also, when article position correction processing that requires this additional processing is performed, there is a risk that the amount of time for which the processing for conveying the article to or from the storage section is interrupted will easily increase and the processing efficiency of the article conveying processing will significantly decrease. However, this is not described in Patent Document 1.

In view of this, it is desirable to realize an article storage facility that can suppress a decrease in the processing efficiency of article conveying processing due to the position of an article stored in a storage section being corrected in a case where multiple articles are stored aligned in the depth direction of the rack in the storage section.

The article storage facility according to the present disclosure is an article storage facility including: a storage rack including a plurality of storage sections aligned along a conveying direction along a horizontal plane; a conveying apparatus configured to move in the conveying direction on a movement path along a front surface of the storage rack and to convey an article to one of the storage sections or from one of the storage sections; and a control apparatus configured to control an operation of the conveying apparatus, wherein each of the plurality of storage sections can store a plurality of articles aligned in a depth direction perpendicular to the conveying direction in plan view, a storage position of an article on a side nearest to the movement path in the depth direction in each of the plurality of storage sections is a first storage position, and an amount of time that has elapsed since an article was stored at the first storage position or an amount of positional misalignment from a reference position of the article stored at the first storage position is a monitoring target amount, the control apparatus monitors the monitoring target amount for each of the plurality of storage sections and causes the conveying apparatus to execute correction processing with the storage section in which the monitoring target amount exceeds a set threshold as a target storage section, and the correction processing is processing for correcting a position of only the article stored at the first storage position in the target storage section to the reference position.

According to the above-described configuration, the control apparatus monitors a monitoring target amount for each of the multiple storage sections and causes the conveying apparatus to execute correction processing with a storage section in which the monitoring target amount has exceeded a set threshold as a target storage section, and therefore it is possible to appropriately select a storage section that is to be subjected to correction processing based on the monitoring target amount. That is, if the amount of time that has elapsed since an article was stored in a first storage position is used as the monitoring target amount, in view of the fact that positional misalignment of the articles due to shaking or the like of the storage rack accumulates more significantly as the amount of elapsed time increases, it is possible to select, based on the length of the amount of elapsed time, a storage section with an article having an amount of positional misalignment from a reference position that may be significant enough to require correction processing. Also, if the amount of positional misalignment from a reference position of an article stored at the first storage position is used as the monitoring target amount, it is possible to select a storage section that requires correction processing based on the size of the amount of positional misalignment of the article from the reference position.

Moreover, according to the above-described configuration, the correction processing is processing for correcting the position of only a target article stored at a first storage position in a target storage section, to a reference position. In a state in which an article (hereinafter referred to as "first article") is stored at a first storage position, in order to correct the storage position of an article (hereinafter referred to as "second article") at a storage position on a side (opposite movement path side) opposite to the movement path in the depth direction with respect to the first storage position, it is necessary to perform additional processing for removing the first article from the storage section, temporarily moving it to another location (e.g., another storage section, etc.), and returning the first article to the original storage section after the end of the processing for correcting the position of the second article. In contrast to this, the article that is to be subjected to the correction processing as described above is limited to the article stored at the first storage position, whereby it is possible to achieve a configuration in which correction processing that requires the above-described additional processing is not performed. For this reason, it is possible to achieve shortening of the amount of time for which the processing for conveying an article to or from the storage section is interrupted by the correction processing, and it is possible to achieve suppression of a decrease in the processing efficiency of the article conveying processing due to correction processing being performed.

Note that position misalignment with respect to the reference position at each storage position due to shaking or the like of the storage rack can occur not only on the article stored at the first storage position but also on the article stored at the storage position on the opposite movement path side with respect to the first storage position. However, by correcting the position of the article stored at the first storage position, it is possible to essentially avoid contact between the article stored in the storage section and the conveying apparatus that moves on the movement path.

As described above, according to the above-described configuration, it is possible to realize an article storage facility that can suppress a decrease in the processing efficiency of the article conveying processing due to the position of an article stored in the storage section being corrected in the case where multiple articles are stored aligned in the depth direction of a rack in a storage section.

Further features and advantages of the article storage facility will become evident from the following description of the embodiments, which are described with reference to the drawings.

DETAILED DESCRIPTION OF PREFERRED EMBODIMENTS

Figure 1:
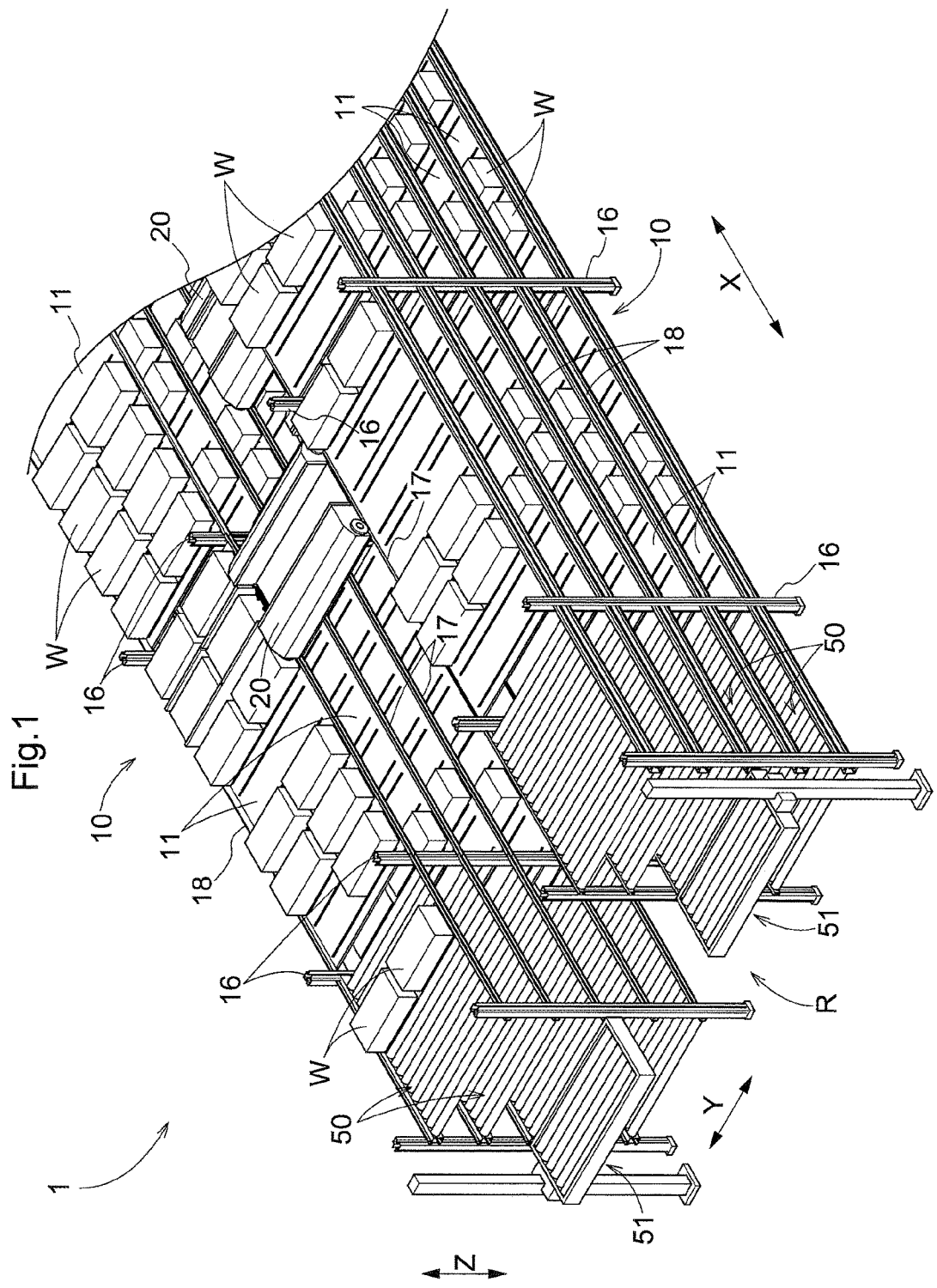
FIG. 1 is a perspective view of part of an article storage facility.

Embodiments of an article storage facility will be described with reference to the drawings. As shown in FIG. 1, the article storage facility 1 includes storage racks 10 including multiple storage sections 12 (see FIG. 2) aligned in a conveying direction X along a horizontal plane, conveying apparatuses 20 that convey articles W to storage sections 12 or from storage sections 12 by moving on a movement path R along the front surfaces of the storage racks 10 in the conveying direction X, and control apparatuses 40 (see FIG. 10) that control operations of the conveying apparatuses 20. A direction perpendicular to the conveying direction X in plan view (here, a direction perpendicular to the conveying direction X in a horizontal plane) is set as a depth direction Y, and the movement path R is formed adjacent to the storage racks 10 in the depth direction Y. The articles W are cardboard cases, container cases, or the like, for example. A pair of the storage racks 10 are set so as to oppose each other in the depth direction Y with the movement path R interposed therebetween, and a later-described transfer apparatus 22 (see FIG. 3) included in each conveying apparatus 20 is configured to be able to transfer an article W to any storage section 12 in either of the pair of storage racks 10.

As shown in FIG. 1, the storage racks 10 include support racks 11 that support the articles W from below. Specifically, the storage racks 10 include multiple sets (hereinafter referred to as "support rod sets") of pairs of support rods 16 aligned in the depth direction Y, in a state of being aligned in the conveying direction X. Each support rod 16 is provided standing on a floor. Also, the support racks 11 are provided spanning between the pair of support rod sets aligned in the conveying direction X. The interval (in other words, the length in the conveying direction X of one support rack 11) between the pair of support rod sets aligned in the conveying direction X is shorter than the length in the conveying direction X of the storage rack 10, and multiple support racks 11 are arranged aligned in the conveying direction X at the same positions in the vertical direction Z. Also, multiple support racks 11 are provided spanning between the pair of support rod sets aligned in the conveying direction X with intervals therebetween in the vertical direction Z, and the storage racks 10 are configured to be able to store the articles W at multiple locations in the vertical direction Z (i.e., at each of multiple levels aligned in the vertical direction Z).

Figure 2:
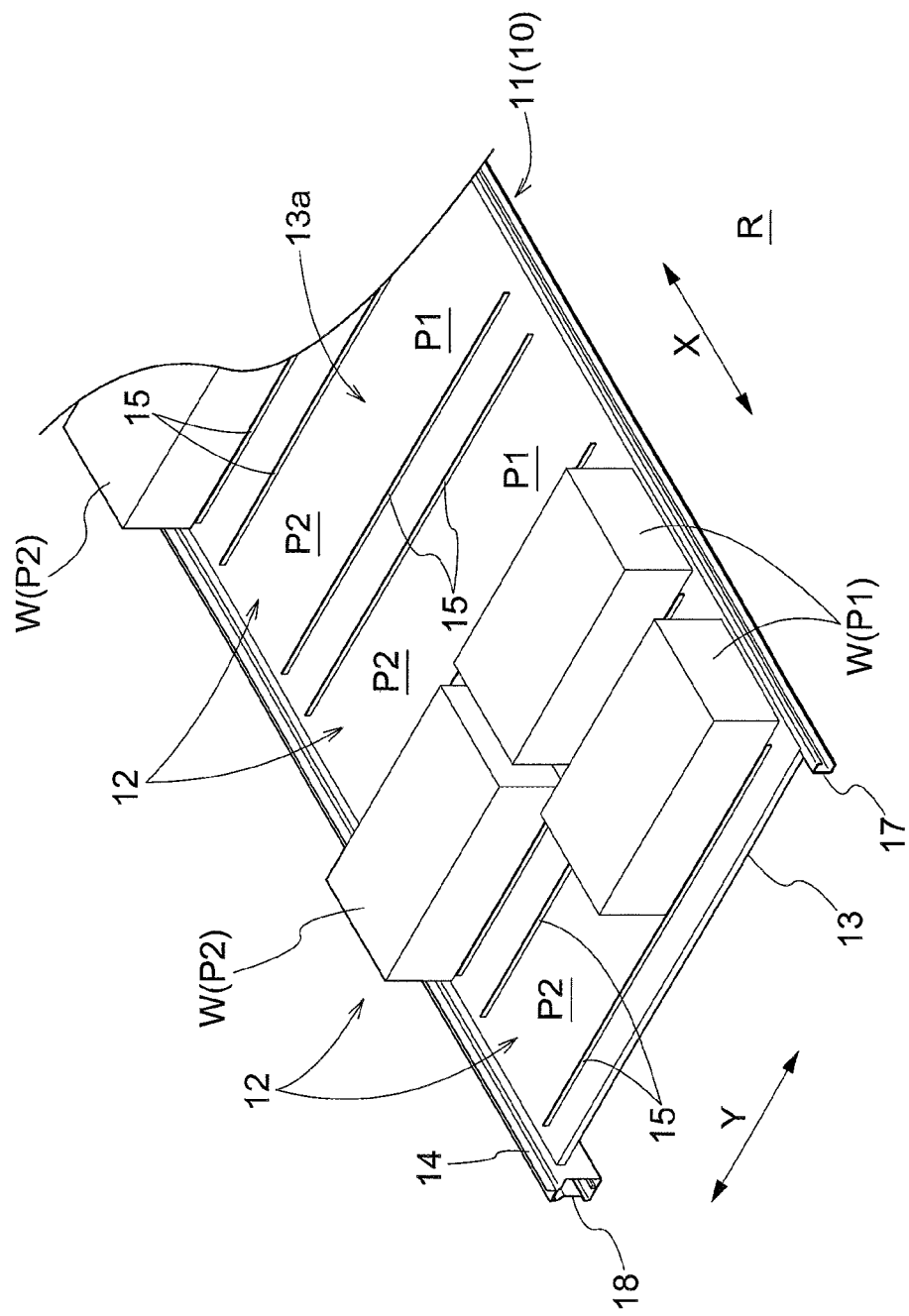
FIG. 2 is a perspective view of part of a support rack.

As shown in FIG. 2, each support rack 11 includes a first beam member 17 disposed on the movement path R side (hereinafter referred to as "movement path side") in the depth direction Y, a second beam member 18 arranged on the side opposite to the movement path R (hereinafter referred to as "opposite movement path side") in the depth direction Y, and a support body 13 arranged so as to span between the first beam member 17 and the second beam member 18. The first beam member 17 and the second beam member 18 are horizontal members that are disposed such that both of their lengthwise directions conform to the conveying direction X. Both end portions in the lengthwise direction of the first beam member 17 are coupled to support rods 16 arranged on the movement path side among the pairs of support rods 16 constituting the support rod set, and both end portions in the lengthwise direction of the second beam members 18 are coupled to support rods 16 arranged on the opposite movement path side among the pairs of support rods 16 constituting the support rod set. Also, the articles W are supported from below by a support surface 13a formed by the upper surface of the support body 13. That is, each of the multiple storage sections 12 included in the storage racks 10 includes a support surface 13a that supports an article W from below.

Note that in the drawings such as FIG. 2, the support surface 13a is depicted as being formed continuously in the conveying direction X, but support surfaces 13a may be formed non-continuously in the conveying direction X. For example, it is possible to use a configuration in which multiple support members 13 that are formed with smaller widths in the conveying direction X than the articles W being supported are arranged in alignment such that a gap formed between two support members 13 that are adjacent in the conveying direction X is smaller than the widths in the conveying direction X of the articles W being supported, and one article W is supported from below by the support surface 13a of each of the multiple support members 13.

Each of the support racks 11 can support multiple articles W in alignment in the conveying direction X. That is, as shown in FIG. 2, multiple storage sections 12 aligned in the conveying direction X are formed on one support rack 11. Also, each of the multiple storage sections 12 can store multiple articles W (specifically, two articles W) aligned in the depth direction Y. That is, in each of the multiple storage sections 12, multiple (here, two) article storage positions are set so as to be aligned in the depth direction Y. As shown in FIG. 2, the storage position of the article W on the side nearest to the movement path R in the depth direction Y in each of the multiple storage sections 12 is set as a first storage position P1, and the storage position of the article W on the side farthest from the movement path R in the depth direction Y in each of the multiple storage sections 12 is set as a second storage position P2. Here, the article storage position on the movement path side among the two article storage positions that are adjacent in the depth direction Y is the first storage position P1, and the article storage position on the opposite movement path side is the second storage position P2. If three or more articles W are stored aligned in the depth direction Y in a storage section 12, one or more other article storage positions are set between the first storage position P1 and the second storage position P2 in the depth direction Y.

Figure 5:
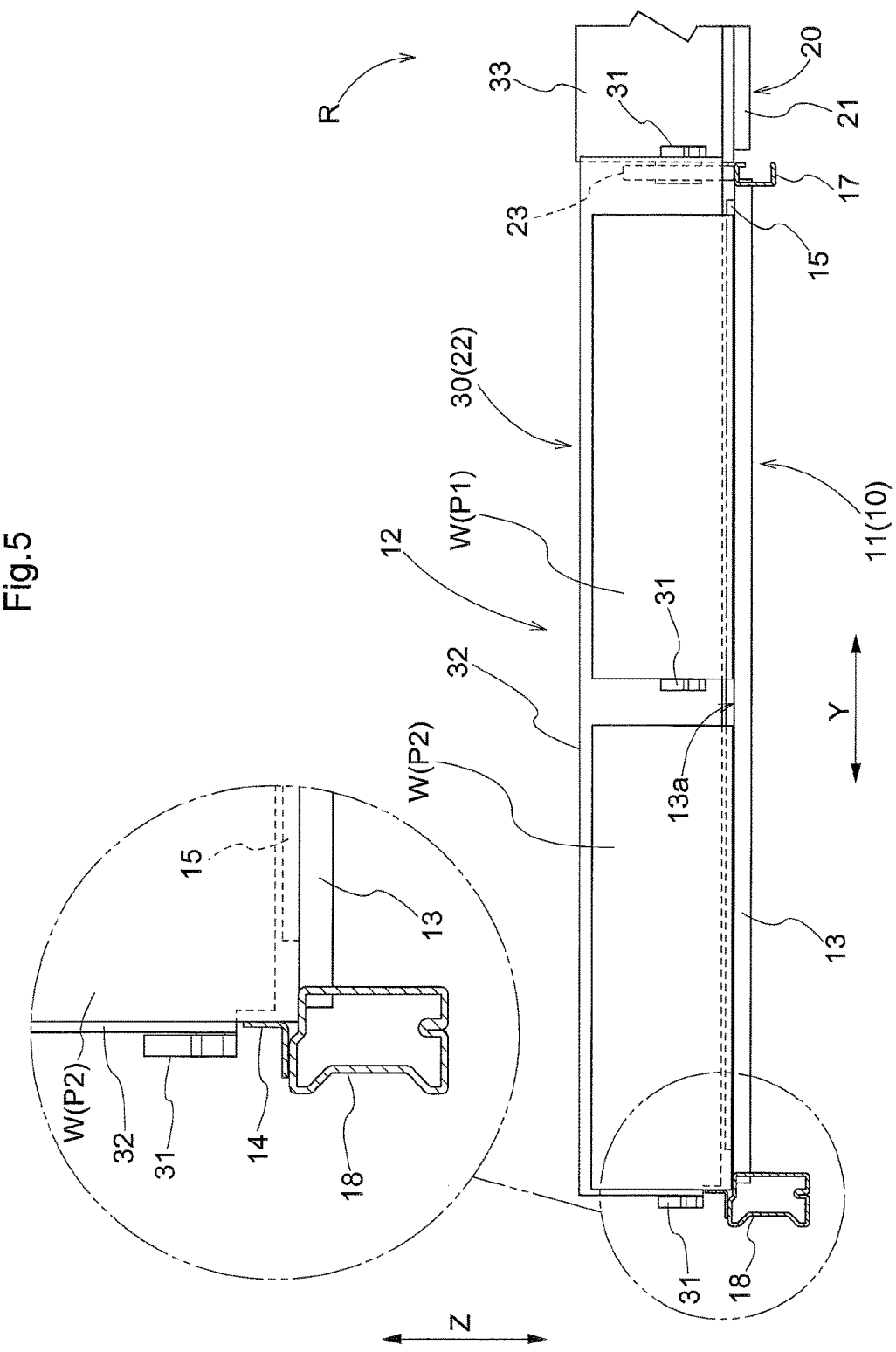
FIG. 5 is a diagram showing a state in which an article stored at a second storage position is in contact with a first restricting body.

As shown in FIG. 2, each of the multiple storage sections 12 includes a first restricting body 14 that comes into contact with the article W stored at the second storage position P2 from the opposite movement path side and restricts movement of the article W to the opposite movement path side. As shown in FIG. 5, the first restricting body 14 includes a restricting surface (here, a vertical surface) that faces the movement path side, at a location that comes into contact with the lower portion of the side surface on the opposite movement path side of the article W stored at the second storage position P2. In FIG. 2, a case is illustrated in which the first restricting body 14 is provided continuously in the conveying direction X, but it is also possible to use a configuration in which first restricting bodies 14 are arranged aligned in the conveying direction X with gaps therebetween. In the present embodiment, the first restricting body 14 corresponds to a "restricting body".

Figure 6:
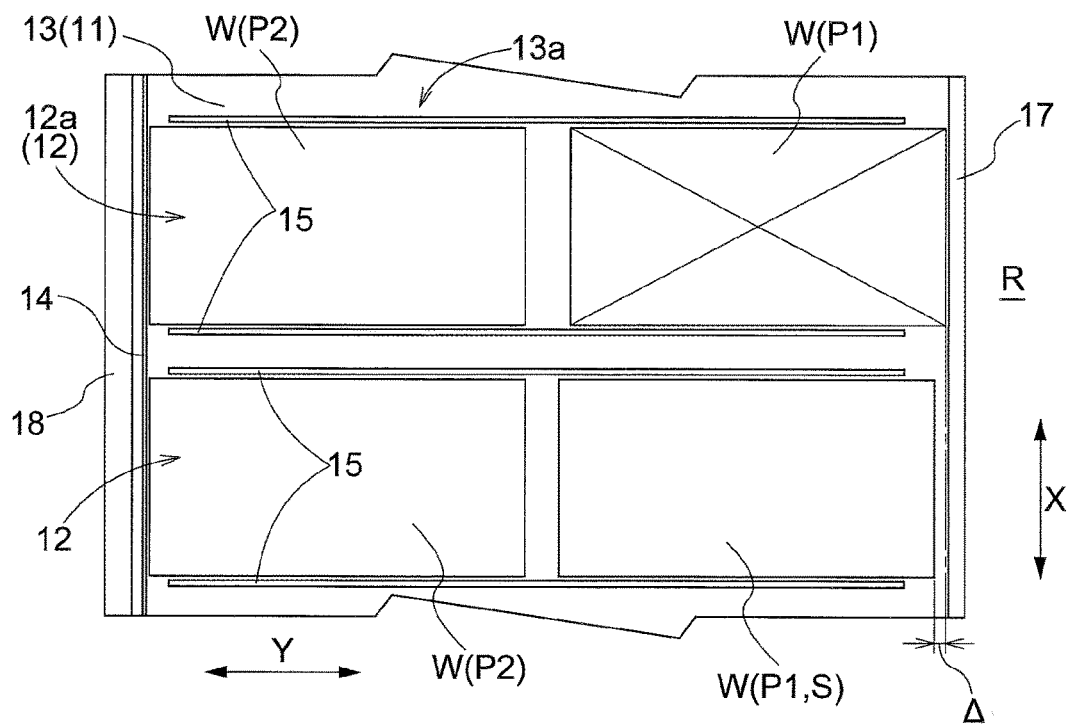
FIG. 6 is a diagram showing a state in which an article stored at a first storage position is misaligned from a reference position.

The storage sections 12 are set such that only one row of articles W aligned in the depth direction Y is arranged within the width in the conveying direction X of each storage section 12. In other words, only one article W is stored at the same location in the depth direction Y of each storage section 12. As shown in FIGS. 2 and 6, each of the storage sections 12 includes second restricting bodies 15 that come into contact with the articles W stored at the article storage positions (here, the first article storage position P1 and the second article storage position P2) from the outside in the conveying direction X (the sides away from the center in the conveying direction X of the articles W) and restrict movement of the articles W toward the outside in the conveying direction X. The second restricting bodies 15 include restricting surfaces (here, vertical surfaces) that face the inside in the conveying direction X (the side facing the center in the conveying direction X of the article W being restricted), at positions that come into contact with the lower portions of the side surfaces on the outer sides in the conveying direction X of the articles W being restricted. The second restricting bodies 15 are provided on both sides in the conveying direction X of each storage section 12, and movement toward both outer sides in the conveying direction X of the articles W stored at the article storage positions is restricted by the two restricting bodies 15 on both sides in the conveying direction X. Note that the interval in the conveying direction X between the second restricting bodies 15 arranged on both sides in the conveying direction X is set according to the width in the conveying direction X of the articles W stored in each storage section 12. If multiple types of articles W that have mutually different widths in the conveying direction X are stored in a storage section 12, the interval in the conveying direction X between the second restricting bodies 15 arranged on both sides in the conveying direction X is set so as to conform to the article W with the largest width in the conveying direction X among the articles W being stored. In FIG. 2, a case is illustrated in which the second restricting bodies 15 are provided continuously in the depth direction Y, but it is also possible to use a configuration in which the second restricting bodies 15 are arranged aligned in the depth direction Y with intervals therebetween.

Figure 3:
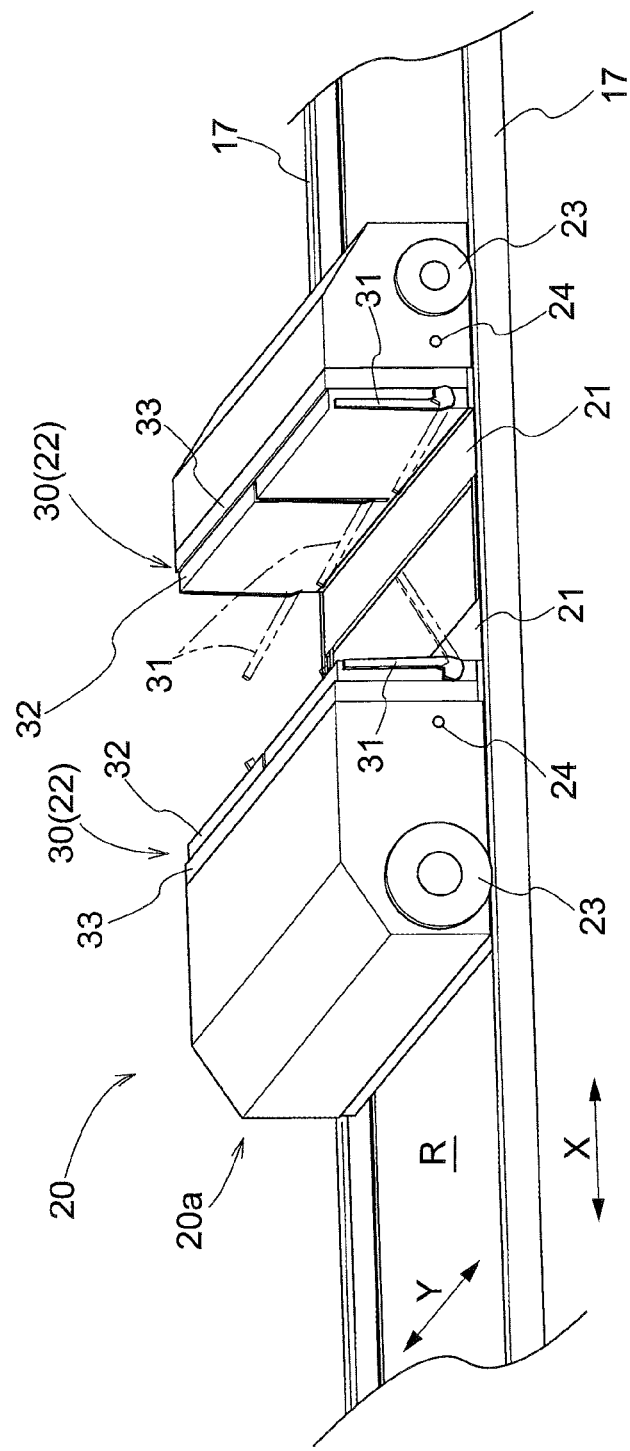
FIG. 3 is a perspective view of a conveying apparatus.

The number of movement paths R on which the conveying apparatuses 20 move is the same as the number of levels of the storage racks 10, so as to correspond to each level of the storage racks 10. Here, the number of levels of the storage racks 10 is the number of support racks 11 aligned in the vertical direction Z, or in other words, the number of storage sections 12 aligned in the vertical direction Z. Specifically, as shown in FIGS. 1 and 3, a movement path R is formed by a pair of first beam members 17 arranged so as to oppose each other in the depth direction Y at the same position in the vertical direction Z. That is, the movement path R is formed by a first beam member 17 coupled to one of the pair of storage racks 10 and a first beam member 17 coupled to the other of the pair of storage racks 10. In the present embodiment, the first beam member 17 corresponds to a "rail".

Figure 4:
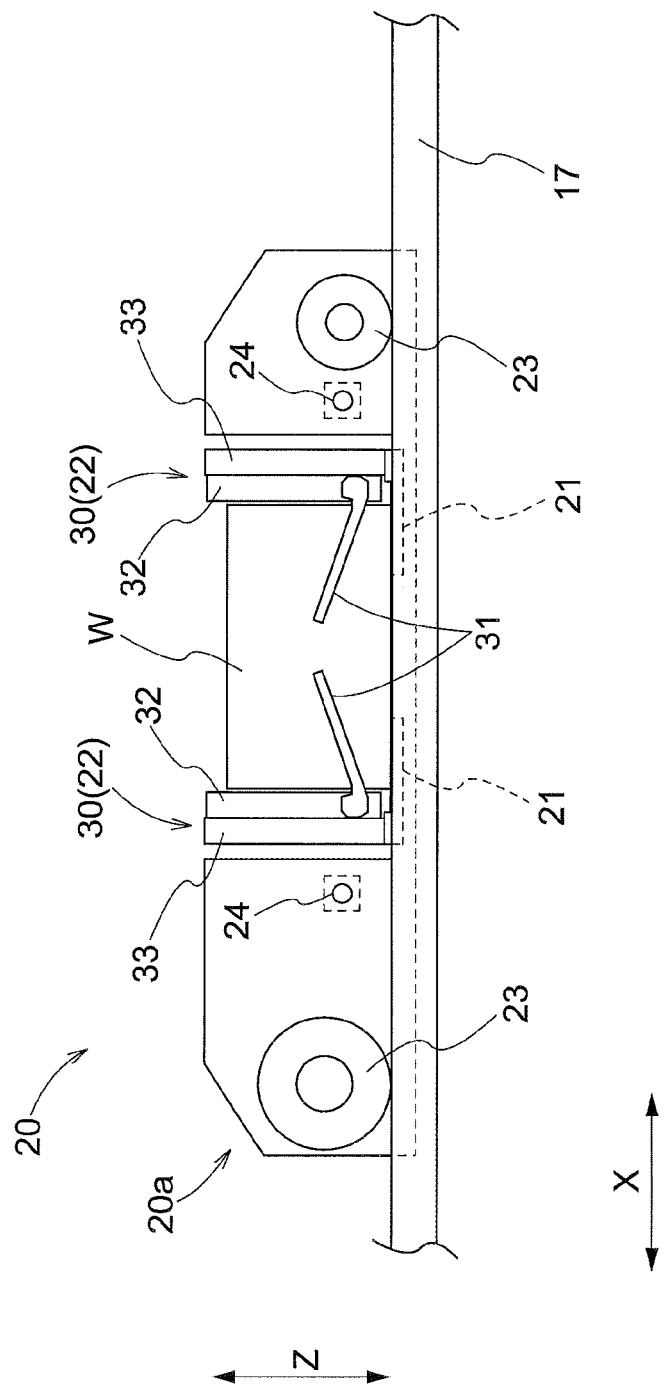
FIG. 4 is a side view of the conveying apparatus.

As described above, the movement paths R are formed by the first beam members 17 coupled to the storage racks 10. Also, a conveying apparatus 20 is arranged on each movement path R formed at multiple positions in the vertical direction Z, and each of the conveying apparatuses 20 conveys an article W to a storage section 12 on the level corresponding to the movement path R on which the conveying apparatus 20 is disposed, or from a storage section 12 on that level. Here, a storage section 12 on a level corresponding to a movement path R is a storage section 12 of a support rack 11 including the first beam member 17 that forms the movement path R. As shown in FIGS. 3 and 4, the conveying apparatus 20 includes wheels 23 that rotate while in contact with the first beam members 17. The wheels 23 roll on travel surfaces formed by the upper surfaces of the first beam members 17. The conveying apparatus 20 includes multiple wheels 23, and specifically includes a set of pairs of wheels 23 arranged separated in the depth direction Y at the same position in the conveying direction X on both sides in the conveying direction X. Also, the conveying apparatus 20 moves on the movement path R to both sides in the conveying direction X by driving at least some of the wheels 23 (e.g., a set of a pair of wheels 23 arranged on one side in the conveying direction X) so as to rotate using a driving power source such as an electric motor.

As shown in FIG. 1, the article storage facility 1 includes relay conveyors 50 at positions adjacent to the storage racks 10 in the conveying direction X. Specifically, a relay conveyor 50 that is adjacent to one of the pair of storage racks 10 in the conveying direction X and a relay conveyor 50 that is adjacent to the other of the pair of storage racks 10 are provided so as to oppose each other in the depth direction Y at each height (position in the vertical direction Z) corresponding to a level of the storage racks 10. One relay conveyor 50 out of the pair of relay conveyors 50 that oppose each other in the depth direction Y is used as a relay conveyor 50 for stocking, and the other relay conveyor 50 is used as a relay conveyor 50 for shipping.

The operations of conveying the article W performed by the conveying apparatus 20 include a stocking conveying operation of conveying the article W to the storage section 12 and a shipping conveying operation of conveying the article W from the storage section 12. In the stocking conveying operation, the article W is conveyed from the relay conveyor 50 for stocking to a storage section 12 on the same level as the relay conveyor 50. Note that the article W to be stocked on a storage rack 10 is conveyed by a lift apparatus 51 to the relay conveyor 50 for stocking from a stocking conveyor (not shown). Also, in the shipping conveying operation, the article W is conveyed from a storage section 12 to the relay conveyor 50 for shipping on the same level as the storage section 12. The article W conveyed to the relay conveyor 50 for shipping is conveyed by a lift apparatus 51 from the relay conveyor 50 for shipping to a shipping conveyor (not shown).

As shown in FIGS. 3 and 4, the conveying apparatus 20 includes a transfer apparatus 22 that transfers an article W between a conveying apparatus 20 and a storage section 12. The transfer apparatus 22 is supported by a main body portion 20a (a portion including members for moving the conveying apparatus 20 in the conveying direction X, such as the wheels 23 and the driving power source of the wheels 23) of the conveying apparatus 20. Also, the conveying apparatus 20 includes a presence sensor 24 that detects whether or not an object exists within a detection range. The presence sensor 24 is provided in the conveying apparatus 20 (main body portion 20a) such that the article storage position in the storage section 12 is included in the detection region, and here, the presence sensor 24 is provided on both sides in the depth direction Y of the main body portion 20a. By determining whether or not the article W is stored in a storage section 12 (article storage position) that is a transfer destination based on the detection information of the presence sensor 24 when processing for transferring the article W from the conveying apparatus 20 to the storage section 12 is performed, it is possible to prevent, to the greatest extent possible, transfer processing in which an article storage position in which an article W is already stored is set as a transfer destination of an article W, and transfer processing in which an article storage position on the opposite movement path side in the same storage section 12 with respect to an article storage position at which an article W is already stored is set as the transfer destination of an article W, from being performed (i.e., double transfer can be prevented to the greatest extent possible). For example, a laser sensor, an infrared sensor, an ultrasonic sensor, or the like can be used as the presence sensor 24.

The transfer apparatus 22 includes an article support portion 21 that supports an article W from below and a slide apparatus 30 that moves the article W along the depth direction Y. Here, a pair of article support portions 21 are provided with an interval therebetween in the conveying direction X, and both end portions in the conveying direction X on the bottom portion of the article W are supported by the pair of article support portions 21. The slide apparatuses 30 are provided on both sides in the conveying direction X, with the positions at which the article W is supported by the article support portions 21 provided therebetween (see FIG. 4). The interval in the conveying direction X between the slide apparatuses 30 (pair of slide apparatuses 30) on both sides in the conveying direction X is set according to the width in the conveying direction X of the article W that is to be transferred. Although it is possible to use a configuration in which the interval in the conveying direction X between the pair of slide apparatuses 30 is fixed and it is possible to use a configuration in which the interval in the conveying direction X between the pair of slide apparatuses 30 can be changed, in the latter case, at least one of the pair of slide apparatuses 30 is supported by the main body portion 20a of the conveying apparatus 20 so as to be able to move in the conveying direction X. Also, in the latter case, the article support portion 21 may be coupled to the slide apparatuses 30 such that the article support portion 21 moves integrally with the slide apparatus 30 in the conveying direction X with respect to the main body portion 20a of the conveying apparatus 20.

Each of the pair of slide apparatuses 30 includes a fixing member 33 whose position in the depth direction Y with respect to the main body portion 20a of the conveying apparatus 20 is fixed, and an extension/retraction member 32 that is supported by the fixing member 33 so as to be able to perform a slide movement along the depth direction Y. The extension/retraction members 32 are directly supported by the fixing members 33 or are indirectly (i.e., via another member that can perform a slide movement along the depth direction Y with respect to the fixing member 33) supported by the fixing members 33. The extension/retraction members 32 are arranged on the inner side in the conveying direction X (the side toward the center in the conveying direction X between the pair of slide apparatuses 30) with respect to the fixing members 33. Also, the extension/retraction members 32 are moved so as to extend or retract (an extending movement to the opposite movement path side, or a retracting movement to the movement path side) along the depth direction Y using the driving power source such as the electric motor. The pair of slide apparatuses 30 are configured to be able to cause the extension/retraction members 32 to perform an extending movement to both sides in the depth direction Y, whereby the article W can be moved to any storage section 12 on either of the pair of storage racks 10. Note that as shown in FIG. 5, the lower end portion of the extension/retraction member 32 is located above the upper end portion of the second restricting body 15 provided in the storage section 12, whereby it is possible to avoid interference between the extension/retraction members 32 and the second restricting bodies 15 regardless of the positional relationship in the conveying direction X between the extension/retraction members 32 and the second restricting bodies 15.

The extension/retraction members 32 are provided with hooks 31 (examples of contacting members) that can swing about axial centers parallel to the depth direction Y. As shown in FIGS. 3 and 5, each extension/retraction member 32 is provided with three hooks, namely a hook 31 that is provided on one end portion in the depth direction Y of the extension/retraction member 32, a hook 31 that is provided on another end portion in the depth direction Y of the extension/retraction member 32, and a hook 31 that is provided at the central portion in the depth direction Y of the extension/retraction member 32. Note that the number of hooks provided on the extension/retraction member 32 can be changed as appropriate according to the number of articles W aligned in the depth direction Y in one storage section 12, or the like. Each of the hooks 31 has its orientation changed to a retracted orientation and a contact orientation by a driving power source such as an electric motor. Here, the retracted orientation is an orientation (orientation of the hooks 31 indicated by the solid lines in FIG. 3) at which the entirety of the hook 31 is disposed on the outer side (side away from the center in the conveying direction X between the pair of slide apparatuses 30) in the conveying direction X with respect to the inner surface (surface facing the inner side in the conveying direction X) of the extension/retraction member 32, and the contact orientation is an orientation (orientation of the hooks 31 indicated by the two-dot chain line in FIG. 3, orientation of the hooks 31 shown in FIG. 4) in which the leading end portion of the hook 31 is disposed on the inner side in the conveying direction X with respect to the inner surface of the extension/retraction member 32.

Figure 7:
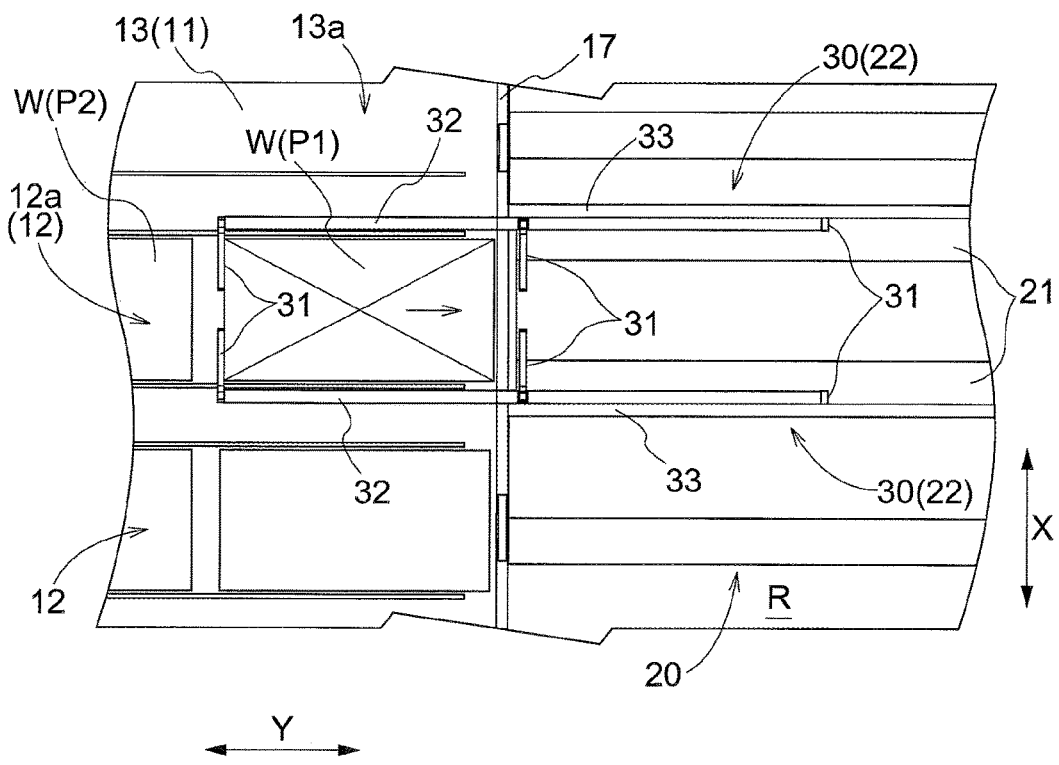
FIG. 7 is a diagram showing an aspect of correction processing.
Figure 8:
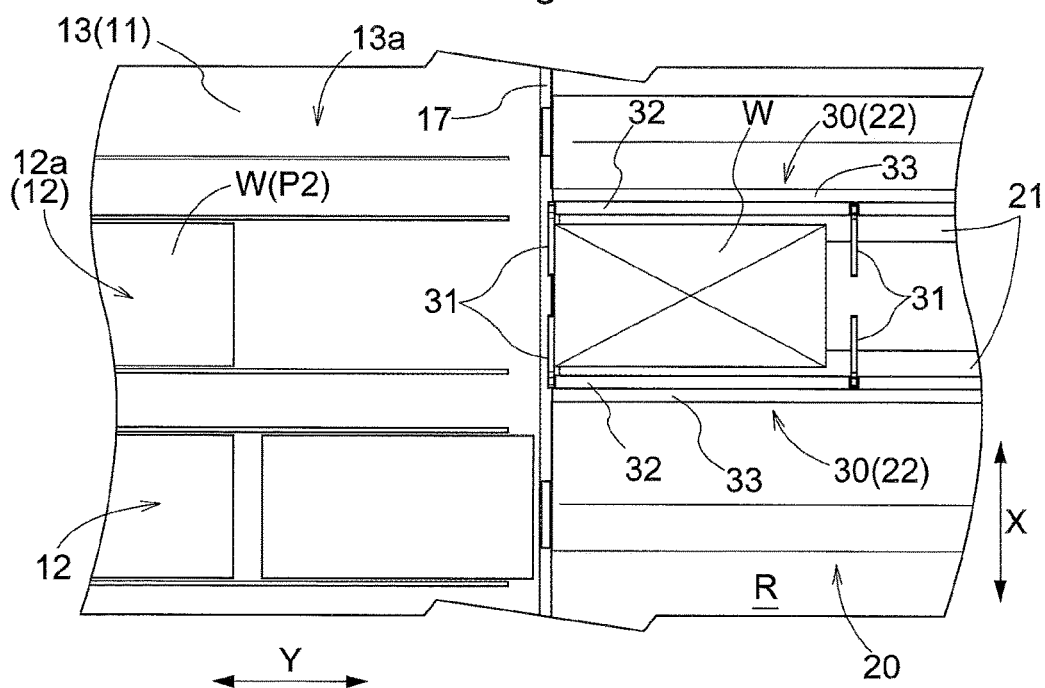
FIG. 8 is a diagram showing an aspect of correction processing.

If the article W is to be transferred from the storage section 12 to the conveying apparatus 20 (article support portion 21), the extension/retraction member 32 of each of the pair of slide apparatuses 30 is moved so as to extend from a position (e.g., the retracted position in which the central position in the depth direction Y of the extension/retraction member 32 matches the central position in the depth direction Y of the fixing member 33) of being set on the article support portion 21 side (main body portion 20a side, see FIG. 3), to a first extension position (see FIG. 7) at which the article W that is to be transferred is disposed between the pair of hooks 31 aligned in the depth direction Y in the state where the orientation of the hooks 31 have been changed to the retracted orientation. If two articles W aligned in the depth direction Y are to be transferred simultaneously to the conveying apparatus 20, the first extension position is set as a position (see FIG. 5) at which each of the two articles W to be transferred are disposed between the pairs of hooks 31 arranged in the depth direction Y. Then, after the orientation of the hooks 31 is changed from the retracted orientation to the contact orientation, as shown in FIG. 8, the extension/retraction member 32 of each of the pair of slide apparatuses 30 is moved so as to retract from the first extension position to the position (e.g., the retracted position) at which the articles W to be transferred are supported only by the article support portions 21. The hooks 31 in the contact orientation come into contact with the articles W while the extension/retraction members 32 of each of the pair of slide apparatuses 30 are moved so as to retract from the first extension position, and thereafter, the articles W are retracted toward the article support portions 21 by the hooks 31 accompanying the retracting movement of the extension/retraction members 32. At this time, the articles W move from the storage section 12 to the article support portions 21 while sliding on the support surface 13a of the storage section 12 to the movement path side along the depth direction Y.

Figure 9:
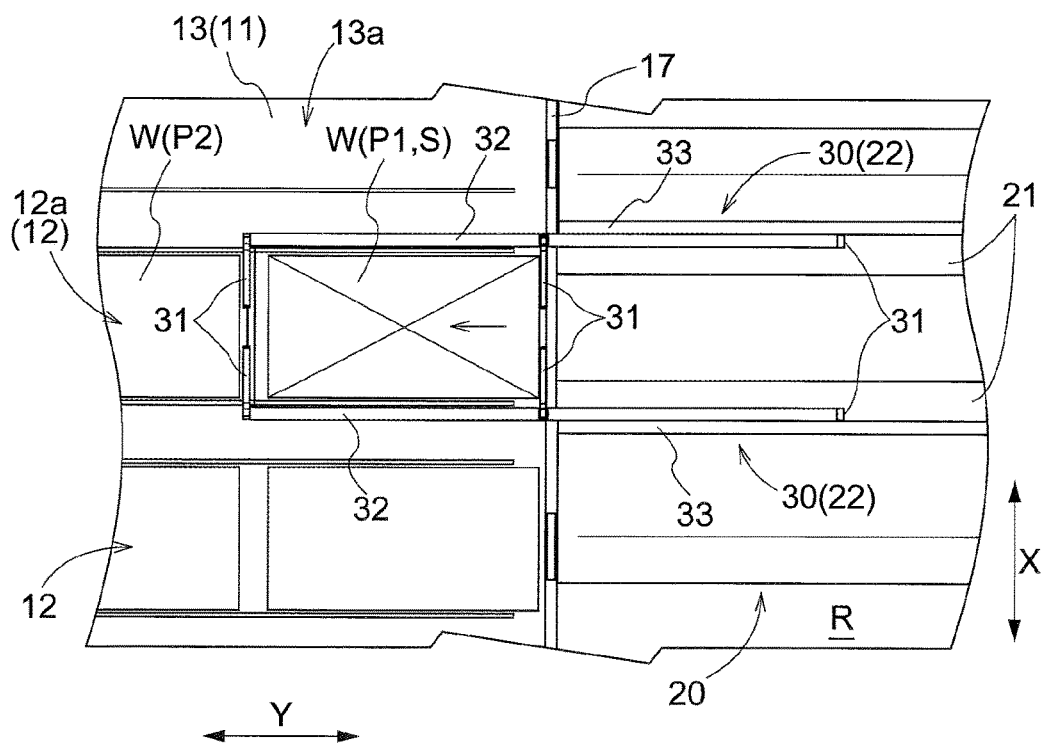
FIG. 9 is a diagram showing an aspect of correction processing.

Also, if an article W is to be transferred from the conveying apparatus 20 (article support portions 21) to a storage section 12, the extension/retraction member 32 of each of the pair of slide apparatuses 30 is moved so as to extend from the position (e.g., the above-described retracted position) of being set on the article support portion 21 side (main body portion 20a side) to a second extension position (see FIG. 9) in which the article W being transferred is supported by only the support surface 13a of the storage section 12 in the state where the orientation of the hooks 31 have been changed to the contact orientation. In the case of transferring two articles W aligned in the depth direction Y simultaneously to the storage section 12, the second extension position is set as a position at which both of the two articles W to be transferred are supported by only the support surface 13a. The hooks 31 in the contact orientation come into contact with the article W while the extension/retraction member 32 of each of the pair of slide apparatuses 30 is moved so as to extend to the second extension position, and thereafter, the article W is pushed out toward the storage section 12 by the hooks 31 accompanying the extension movement of the extension/retraction member 32. At this time, the article W moves from the article support portions 21 to the storage section 12 while sliding on the support surface 23a of the storage section 21 to the opposite movement path side along the depth direction Y. Then, after the orientation of the hooks 31 is changed from the contact orientation to the retracted orientation, the extension/retraction member 32 of each of the pair of slide apparatuses 30 is moved so as to retract from the second extension position to a position (e.g., the above-described retracted position) of being set on the article support portion 21 side (main body portion 20a side).

Thus, the transfer apparatus 22 is configured to slide the article W along the depth direction Y on the support surface 13a when the article W is to be transferred between the conveying apparatus 20 and the storage section 12. The article support portion 21 included in the transfer apparatus 22 may be configured to include a conveyor apparatus (e.g., a belt conveyor or the like) that conveys the article in the depth direction Y in a state of supporting the article W from below, although this will not be described in detail. In this case, the operations of the conveyor apparatus included in the article support portion 21 are controlled so as to be synchronized with the conveying direction and conveying speed of the article W due to the extending/retracting movement of the extension/retraction member 32. Also, it is possible to use a configuration in which the article support portion 21 is disposed at an intermediate position (e.g., a central position) in the conveying direction X between the pair of slide apparatuses 30 and the article support portion 21 supports the central portion in the conveying direction X of the bottom portion of the article W.

As described above, each of the storage sections 12 includes a first restricting body 14. Also, as shown in FIG. 5, each of the pair of slide apparatuses 30 is configured to be able to move the extension/retraction member 32 to the opposite movement path side along the depth direction Y, up to a position at which an article W in contact with the first restricting body 14 at the second storage position P2 is arranged between the pair of hooks 31 aligned in the depth direction Y. Accordingly, the transfer apparatus 22 can transfer the article W in contact with the first restricting body 14 at the second storage position P2 to the conveying apparatus 20. Note that as shown in FIG. 5, the disposing height and the shapes of the hooks 31 and the extension/retraction members 32 are set such that the hooks 31 and the extension/retraction members 32 do not interfere with the first restricting body 14 also in the case where the extension/retraction member 32 is moved to a position shown in FIG. 5.

Figure 10:
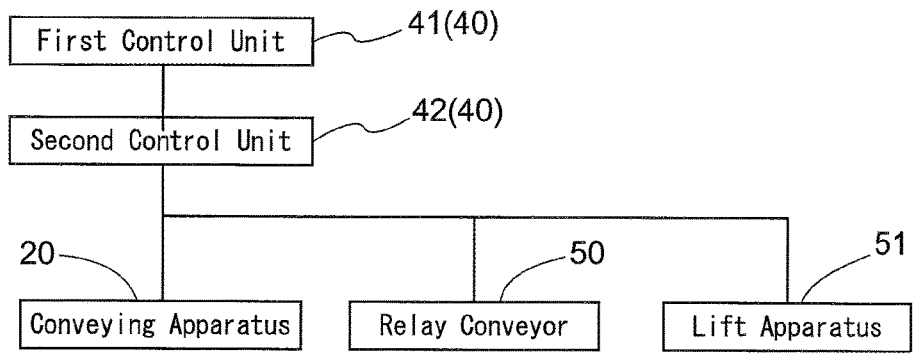
FIG. 10 is a control block diagram.

Next, a control configuration of an article storage facility 1 according to the present embodiment will be described. As shown in FIG. 10, the control apparatus 40 includes a first control unit 41 and a second control unit 42. The first control unit 41, the second control unit 42, the conveying apparatuses 20, the relay conveyors 50, and the lift apparatuses 51 are connected by wire or wirelessly so as to be able to communicate with each other. The control apparatus 40 (here, the first control unit 41 and the second control unit 42) includes an arithmetic processing apparatus such as a CPU and includes a peripheral circuit such as a memory, and the functions of the control apparatus 40 are realized through cooperation between such hardware and programs executed on hardware such as the arithmetic processing apparatus. Note that multiple control units (here, the first control unit 41 and the second control unit 42) included in the control apparatus 40 are at least logically divided, and do not necessarily need to be physically divided (i.e., may be provided in hardware used in common). Also, one or both of the first control unit 41 and the second control unit may be divided into multiple functional portions.

The first control unit 41 generates conveying instruction data (data including conveying request information) that includes identification information of the article W to be conveyed, conveying source information of the article W to be conveyed, and conveying destination information of the article W to be conveyed, and transmits the generated conveying instruction data to the second control unit 42. For example, the first control unit 41 generates the conveying instruction data based on a conveying schedule corresponding to a task schedule, or based on a task instruction (task request) from a task instruction apparatus (not shown). If the conveying source or conveying destination of the article W to be conveyed is a storage section 12 of the storage rack 10, the conveying instruction data includes an instruction to convey the article W to or from the storage section 12. That is, in this case, the first control unit 41 outputs an instruction to convey the article W to or from the storage section 12 to the second control unit 42.

Based on the conveying instruction data received from the first control unit 41, the second control unit 42 generates conveying data to which the article conveying apparatus in charge of conveying the article W designated by the conveying instruction data is allocated. Also, the second control unit 42 instructs the article conveying apparatuses to execute conveying processing according to the generated conveying data. The article storage facility 1 is included in a distribution facility (distribution center), and the conveying of the article W designated by the conveying instruction data is realized through cooperation between the article conveying apparatuses (the conveying apparatuses 20, the relay conveyors 50, and the lift apparatuses 51) included in the article storage facility 1 and another article conveying apparatus included in the distribution facility, although the details are not included here.

If the conveying apparatus 20 is included among the article conveying apparatuses in charge of conveying the article W designated by the conveying instruction data, the second control unit 42 instructs the conveying apparatus 20 to execute the conveying processing according to the conveying instruction (the instruction to convey the article W to or from the storage section 12) received from the first control unit 41. Note that the second control unit 42 is configured to manage the conveying instruction received from the first control unit 41 as an unprocessed conveying instruction in the period up to when the conveying apparatus 20 is instructed to execute the conveying processing according to the conveying instruction. The information of the unprocessed conveying instruction is stored in a storage unit that is included in the second control unit 42 or can be referenced by the second control unit 42, and by referencing this storage unit, the second control unit 42 determines whether or not later-described unprocessed conveying processing exists (step #01 in FIG. 11).

Each of the article conveying apparatuses such as the conveying apparatus 20 includes a device control apparatus (device controller) that controls operations of the article conveying apparatuses according to instructions from the second control unit 42, although that is not shown here. Each of the device control apparatuses is configured to transmit, to the second control unit 42, information on the results of processing whose execution was instructed by the second control unit 42 (e.g., processing completion information). The device control apparatus included in the conveying apparatus 20 controls the operation of the conveying apparatus 20 (here, the traveling operation of the main body portion 20a and the transfer operation of the transfer apparatus 22) by controlling the driving of the various motors based on the detection information of various sensors (e.g., a rotary encoder, a laser distance meter, and the like). The device control apparatus of the conveying apparatus 20 includes, for example, a first optical communication apparatus provided on an end portion in the conveying direction X of the movement path R, and a second optical communication apparatus that is provided on the main body portion 20a and performs optical communication with the first optical communication apparatus.

The device control apparatus included in the conveying apparatus 20 controls the traveling operation of the main body portion 20a and the transfer operation of the transfer apparatus 22 such that if execution of processing for conveying the article W from the storage section 12 and to the relay conveyor 50 is instructed by the second control unit 42, movement processing for moving the conveying apparatus 20 (main body portion 20a) to a position opposing the storage section 12 that is the conveying source in the depth direction Y, transfer processing for transferring the article W to the conveying apparatus 20 from the storage section 12 that is the conveying source, movement processing for moving the conveying apparatus 20 (main body portion 20a) to a position opposing the relay conveyor 50 that is the conveying destination in the depth direction Y, and transfer processing for transferring the article W to the relay conveyor 50 that is the conveying destination from the conveying apparatus 20, are executed in the stated order. Also, the device control apparatus included in the conveying apparatus 20 controls the traveling operation of the main body portion 20a and the transfer operation of the transfer apparatus 22 such that if execution of processing for conveying the article W from the relay conveyor 50 and to the storage section 12 is instructed by the second control unit 42, movement processing for moving the conveying apparatus 20 (main body portion 20a) to a position opposing the relay conveyor 50 that is the conveying source in the depth direction Y, transfer processing for transferring the article W to the conveying apparatus 20 from the relay conveyor 50 that is the conveying source, movement processing for moving the conveying apparatus 20 (main body portion 20a) to a position opposing the storage section 12 that is the conveying destination in the depth direction Y, and transfer processing for transferring the article W to the storage section 12 that is the conveying destination from the conveying apparatus 20, are executed in the stated order.

As described above, the second control unit 42 instructs the conveying apparatus 20 (the device control apparatus included in the conveying apparatus 20) to execute conveying processing according to the conveying instruction received from the first control unit 41, but the second control unit 42 is configured to instruct the conveying apparatus 20 to furthermore execute correction processing as well. Specifically, the control apparatus 40 (here, the second control unit 42) monitors the monitoring target amount for each of the multiple storage sections 12 and causes the conveying apparatus 20 to perform correction processing using a storage section 12 in which the monitoring target amount has exceeded a set threshold as a target storage section 12a. Also, in the correction processing, the position of the article W stored at the first storage position P1 in the target storage section 12a is corrected to the reference position S. That is, the correction processing is processing in which only the article W stored at the first storage position P1 in the target storage section 12a is used as a target and the position of the target article W is corrected to the reference position S. The reference position S is a position that serves as a reference for when the article W is stored at the first storage position P1, and the transfer operation performed by the transfer apparatus 22 is controlled such that the article W is arranged at the reference position S (i.e., with the reference position S serving as a target position) when the article W is to be transferred from the conveying apparatus 20 to the first storage position P1 using the transfer apparatus 22.

In the present embodiment, the monitoring target amount is the amount of time that has elapsed since the article W was stored at the first storage position P1. The control apparatus 40 creates and manages rack stock data obtained by associating the identity information of the article W and the information on the storage position for each article W stored in the storage section 12, and the rack stock data includes information relating to the time when the article W was stored in the storage section 12 (information on the date or information on both the date and the time). The second control unit 42 references the rack stock data and acquires information on the amount of time that has elapsed since the article W was stored at the first storage position P1. The above-described threshold that is compared with the monitoring target value can be set to a value in units of days or a value in units of months, and for example, can be set to one month. It is also possible to set the threshold to different values according to the type and the state of the article W with consideration given to the fact that the amount of positional misalignment of the article W can change according to the type (material of the bottom surface, etc.) and the state (weight, etc.) of the article W. Note that the information on the type and the state of the article W can be obtained by referencing the rack stock data or through measurement.

FIG. 6 shows a state in which an article W stored at the first storage position P1 is disposed misaligned by a positional misalignment amount Δ to the movement path side from the reference position S in the storage section 12 selected as the target storage section 12a, and an article W stored at the first storage position P1 is disposed at the reference position S in the storage section 12 adjacent in the conveying direction X to the target storage section 12a. In the correction processing, the position of the article W stored at the first storage position P1 in the target storage section 12a in this manner is corrected to the reference position S. Note that in the present embodiment, the control apparatus 40 is configured to cause the conveying apparatus 20 to execute the correction processing if the monitoring target amount (amount of time that has elapsed since the article W was stored at the first storage position P1) has exceeded the threshold, regardless of the positional misalignment amount Δ from the reference position S of the article W stored at the first storage position P1 of the target storage section 12a. For this reason, an article W that is stored at the first storage position P1 in a state in which the positional misalignment amount Δ from the reference position S is zero or is small can also be subjected to the correction processing.

In the present embodiment, as shown in FIGS. 6 to 9, the correction processing is processing for re-doing the processing for transferring the article W stored at the first storage position P1 in the target storage section 12a from the conveying apparatus 20 to the storage section 12. That is, the correction processing includes processing for transferring the article W stored at the first storage position P1 of the target storage section 12a to the conveying apparatus 20 and processing for transferring the article W from the conveying apparatus 20 to the first storage position P1 of the same storage section 12 (target storage section 12a). Specifically, the device control apparatus included in the conveying apparatus 20 controls the traveling operation of the main body portion 20a and the transfer operation of the transfer apparatus 22 such that when an instruction is given by the second control unit 42 to execute the correction processing, movement processing for moving the conveying apparatus 20 (main body portion 20a) to a position opposing the target storage section 12a in the depth direction Y, transfer processing (see FIGS. 7 and 8) for transferring the article W from the first storage position P1 of the target storage section 12a to the conveying apparatus 20, and transfer processing (see FIG. 9) for transferring the article W from the conveying apparatus 20 to the first storage position P1 of the target storage section 12a, are executed in the stated order. Note that the processing for adjusting the position (e.g., the position in the depth direction Y) of the article W on the conveying apparatus 20 to the reference position on the conveying apparatus 20 side (the reference position on the transfer apparatus 22 side) may be performed before the article W is transferred from the conveying apparatus 20 to the first storage position P1 of the target storage section 12a. Also, the processing for adjusting the position in the conveying direction X of the conveying apparatus 20 may be performed before the article W is transferred from the conveying apparatus 20 to the first storage position P1 of the target storage section 12a.

In the present embodiment, the second control unit 42 is configured to instruct the conveying apparatus 20 to execute one instance of unprocessed correction processing, under at least the condition that no unprocessed conveying instruction (conveying instruction from the first control unit 41) exists, the conveying apparatus 20 is not executing the conveying processing corresponding to the conveying instruction from the first control unit 41, and the conveying apparatus 20 is not executing the correction processing. That is, if a target storage section 12*a* exists among the multiple storage sections 12, the second control unit 42 manages the correction processing performed on the article W stored at the first storage position P1 of the target storage section 12*a* as unprocessed correction processing in the period up to when the above-described condition is satisfied. The information of the unprocessed correction processing is stored in a storage unit that is included in the second control unit 42 or can be referenced by the second control unit 42, and by referencing this storage unit, the second control unit 42 determines whether or not later-described unprocessed correction processing exists (step #05 in FIG. 11).

Figure 11:
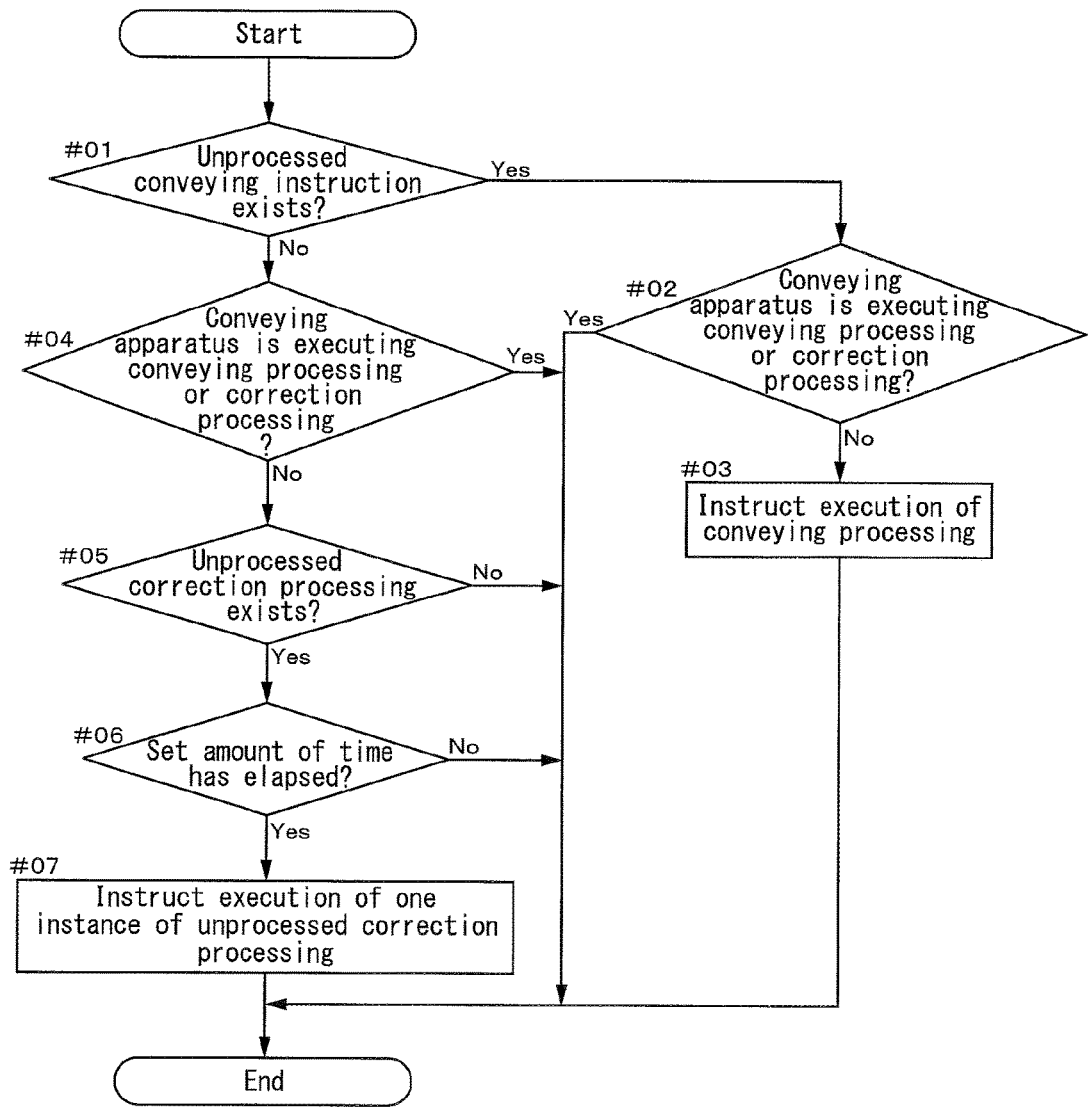
FIG. 11 is a flowchart showing a processing procedure executed by a control apparatus.

Hereinafter, a flow of processing for when the second control unit 42 instructs the conveying apparatus 20 to execute correction processing will be described with reference to the flowchart shown in FIG. 11. The processing shown in FIG. 11 is executed repeatedly by the second control unit 42. Also, this processing is executed on each level of the storage rack 10 (i.e., on each movement path R formed at the multiple positions in the vertical direction Z). That is, the timing at which the second control unit 42 instructs the conveying apparatus 20 to execute the correction processing is determined regardless of whether or not an unprocessed conveying instruction to the conveying apparatuses 20 on the other levels (the other movement paths R) exists and whether or not the conveying apparatuses 20 on the other levels are executing conveying processing or correction processing.

The second control unit 42 determines whether or not an unprocessed conveying instruction (step #01) exists and if an unprocessed conveying instruction exists (step #01: Yes), the second control unit 42 instructs the conveying apparatus 20 to execute conveying processing according to the unprocessed conveying instruction (step #03), under the condition that the conveying apparatus 20 is not executing conveying processing or correction processing (step #02: No). If multiple unprocessed conveying instructions exist, it is possible to use a configuration in which the second control unit 42 instructs the conveying apparatus 20 to collectively execute multiple instances of conveying processing corresponding to all or some of multiple conveying instructions among the unprocessed conveying instructions and the conveying apparatus 20 continuously executes the multiple instances of conveying processing in sequence, or a configuration in which the second control unit 42 instructs the conveying apparatus 20 to execute only conveying processing corresponding to one unprocessed conveying instruction (e.g., the conveying processing received the earliest from the first control unit 41). On the other hand, if the conveying apparatus 20 is executing the conveying processing or the correction processing (step #02: Yes), after the conveying processing or the correction processing performed by the conveying apparatus 20 has ended (step #02: No), the conveying apparatus 20 is instructed to execute the conveying processing corresponding to the unprocessed conveying instruction (step #03).

On the other hand, if no unprocessed conveying instruction exists (step #01: No), the second control unit 42 instructs the conveying apparatus 20 to execute one instance of unprocessed correction processing (step #07) under the condition that the conveying apparatus 20 is not executing conveying processing or correction processing (step #04: No), the unprocessed correction processing exists (step #05: Yes), and a set amount of time has elapsed (step #06: Yes). If multiple instances of unprocessed correction processing exist, it is possible to use a configuration in which correction processing in which the target storage section 12*a* to be subjected to the correction processing is the closest to the relay conveyor 50 is selected as the one instance of correction processing whose execution is to be instructed to the conveying apparatus 20. Note that in step #06, it is determined whether or not the amount of time for which the state in which no unprocessed conveying instruction exists and the conveying apparatus 20 is not executing the conveying processing or the correction processing (step #01: No, step #04: No) continues has exceeded the set amount of time. That is, in the present embodiment, the conditions for instructing the conveying apparatus 20 to execute one instance of unprocessed correction processing include the condition that a specific state (the state in which no unprocessed conveying instruction exists and the conveying apparatus is not executing the conveying processing or the correction processing) has continued for the set amount of time. On the other hand, if the conveying apparatus 20 is executing the conveying processing or the correction processing (step #04: Yes) or if the set amount of time has not elapsed (step #06: No), the conveying apparatus 20 is not instructed to execute the unprocessed correction processing, even if unprocessed correction processing exists.

Other Embodiments

Next, other embodiments of the article storage facility will be described.

(1) In the above-described embodiment, an exemplary configuration was described in which the monitoring target amount is the amount of time that has elapsed since the article W was stored at the first storage position P1. However, there is no limitation to this kind of configuration, and the monitoring target amount may be the positional misalignment amount $\Delta$ from the reference position S of the article W stored at the first storage position P1. The threshold compared with the monitoring target amount in this case is set to a value within a range in which contact between the article W stored at the first storage position P1 and the conveying apparatus 20 that moves the movement path R can be avoided. If the monitoring target amount is thus set to be the positional misalignment amount $\Delta$ from the reference position S of the article W, the positional misalignment amount $\Delta$ may be limited to the amount of positional misalignment in the depth direction Y from the reference position S of the article W, and the positional misalignment amount $\Delta$ may further be limited to the amount of positional misalignment to the movement path side in the depth direction Y from the reference position S of the article W.

If the monitoring target amount is the positional misalignment amount $\Delta$ from the reference position S of the article W stored at the first storage position P1, a detection apparatus for detecting the positional misalignment amount $\Delta$ is provided in the storage racks 10 or the conveying apparatus 20, and the control apparatus 40 (in the example of the above-described embodiment, the second control unit 42) acquires the positional misalignment amount $\Delta$ based on the detection information of the detection apparatus. If the above-described presence sensor 24 included in the conveying apparatus 20 is configured to detect whether or not an object exists at the first storage position P1 using a method according to which it is possible to acquire information on the distance to the object (e.g., if a laser distance sensor is used as the presence sensor 24), it is possible to use a configuration in which the presence sensor 24 is used as the above-described detection apparatus and the control apparatus 40 acquires the positional misalignment amount Δ from the reference position S of the article W stored at the first storage position P1 based on the detection information of the presence sensor 24. Also, it is possible to use a configuration in which an image capturing apparatus that captures an image of the article W stored at the first storage position P1 is used as the detection apparatus and the control apparatus 40 acquires the positional misalignment amount Δ from the reference position S of the article W stored at the first storage position P1 based on the captured image of the article W captured by the image capturing apparatus.

(2) In the above-described embodiment, an exemplary configuration was described in which the correction processing is processing for re-doing the processing for transferring the article W stored at the first storage position P1 of the target storage section 12a from the conveying apparatus 20 to the storage section 12. However, there is no limitation to this kind of configuration, and for example, the correction processing can be processing for correcting the position of the article W stored at the first storage position P1 of the target storage section 12a to the reference position S without transferring the article W from the storage section 12 to the conveying apparatus 20 (i.e., without being taken out from the storage section 12). Specifically, the correction processing can be processing for moving the extension/retraction member 32 of each of the pair of slide apparatuses 30 in the depth direction Y to correct the position of the article W to the reference position S in a state in which the article W stored at the first storage position P1 is disposed between the pair of hooks 31 in the contact orientation aligned in the depth direction Y. Also, if only the positional misalignment from the reference position S to the movement path side of the article W stored at the first storage position P1 is corrected, the correction processing can be processing in which the article W is pushed to the reference position S by applying contact to the article W stored at the first storage position P1 from the movement path side. In this case, it is possible to use a configuration in which the article W is pushed using the transfer apparatus 22 (hooks 31) provided in the conveying apparatus 20 or a configuration in which the article W is pushed using a dedicated pushing member provided in the conveying apparatus 20.

(3) In the above-described embodiment, an exemplary configuration was described in which the second control unit 42 instructs the conveying apparatus 20 to execute one instance of unprocessed correction processing, under the condition that no unprocessed conveying instruction exists, the conveying apparatus 20 is not executing conveying processing, and the conveying apparatus 20 is not executing correction processing, and furthermore under the condition that a specific state (the state in which no unprocessed conveying instruction exists and the conveying apparatus is not executing conveying processing or correction processing) continues for a set amount of time. However, there is no limitation to this kind of configuration, and it is also possible to use a configuration in which the conditions for instructing the conveying apparatus 20 to execute the unprocessed correction processing do not include the condition that the above-described specific state continues for a set amount of time. It is also possible to use a configuration in which the conditions for instructing the conveying apparatus 20 to execute the unprocessed correction processing do not include the condition that no unprocessed conveying instruction exists, and the correction processing is executed with a higher priority than the conveying processing corresponding to the unprocessed conveying instruction. Also, in the above-described embodiment, an exemplary configuration in which the second control unit 42 instructs the conveying apparatus 20 to execute one instance of unprocessed correction processing if the above-described condition is satisfied, but it is also possible to use a configuration in which if multiple instances of unprocessed correction processing exist when the above-described condition is satisfied, the second control unit 42 instructs the conveying apparatus 20 to collectively execute all or some of the multiple instances of correction processing among the unprocessed correction processing.

(4) In the above-described embodiment, an exemplary configuration was described in which the hooks 31 are provided in the extension/retraction member 32 of each of the pair of slide apparatuses 30, and the article W is transferred between the conveying apparatus 20 and the storage section 20 by pushing out or pulling in the article W using the hooks 31 in the contact orientation. However, there is no limitation to this kind of configuration, and for example, it is also possible to use a configuration in which no hooks 31 are provided on the extension/retraction member 32 of each of the pair of slide apparatuses 30 and the article W is transferred between the conveying apparatus 20 and the storage section 12 by causing the extension/retraction member 32 to move so as to extend and retract along the depth direction Y in a state in which the article W is sandwiched from both sides in the conveying direction X by the extension/retraction members 32 of the pair of slide apparatuses 30.

(5) In the above-described embodiment, an exemplary configuration was described in which the transfer apparatus 22 slides the article W along the depth direction Y on the support surface 13a when the article W is to be transferred between the conveying apparatus 20 and the storage section 12. However, there is no limitation to this kind of configuration, and it is also possible to use a configuration in which the transfer apparatus 22 does not slide the article W on the support surface 13a when the article W is to be transferred between the conveying apparatus 20 and the storage section 12. For example, it is possible to use a configuration in which, as a mechanism for moving the article W in the depth direction Y, the transfer apparatus 22 includes a mechanism for moving the article support portion 21 (e.g., the article support portion that supports the central portion in the conveying direction X on the bottom portion of the article W from below) so as to extend and retract along the depth direction Y, instead of the pair of slide apparatuses 30, and it is possible to use a configuration in which the article W is transferred between the conveying apparatus 20 and the storage section 12 by raising and lowering the article support portion 21 or the entirety of the transfer apparatus 22 with the article support portion 21 extended toward the storage section 12.

(6) In the above-described embodiment, an exemplary configuration was described in which the movement path R is formed by the first beam members 17 coupled to the storage racks 10. However, there is no limitation to this kind of configuration, and for example, it is also possible to use a configuration in which the conveying apparatus 20 is a stacker crane, and to use a configuration in which the movement path R is formed by a lower rail provided on the floor and an upper rail provided above the lower rail. In this case, the conveying apparatus 20 includes a wheel that rotates in contact with the lower rail and a wheel that rotates in contact with the upper rail. In this kind of configuration, it is also possible to use a configuration in which the upper rail is coupled to the storage rack 10. As the conveying apparatus 20, it is also possible to use an article conveying apparatus that autonomously travels on the floor surface while being aware of its own current position, instead of an article conveying apparatus that moves on the movement path formed by the rails.

(7) In the above-described embodiment, an exemplary configuration was described in which each of the storage sections 12 includes a second restricting body 15. However, there is no limitation to this kind of configuration, and it is also possible to use a configuration in which the storage section 12 does not include the second restricting body 15. In this case, it is also possible to use a configuration in which the position (position in the conveying direction X) of the storage section 12 in the support rack 11 is not fixed, and the position of the storage section 12 in the storage rack 11 is set according to the width in the conveying direction X of the article W when the article W is to be stored in the storage rack 10.

(8) In the above-described embodiment, an exemplary configuration was described in which each of the storage sections 12 includes a first restricting body 14. However, there is no limitation to this kind of configuration, and it is also possible to use a configuration in which the storage section 12 does not include the first restricting body 14. For example, it is possible to use a configuration in which the storage section 12 does not include the first restricting body 14 in the case where the movement path R of the conveying apparatus 20 is formed on both sides in the depth direction Y with the storage rack 10 interposed therebetween. In this case, it is preferable to use a configuration in which each of the conveying apparatuses 20 arranged on both sides in the depth direction Y with the storage rack 10 interposed therebetween execute the above-described correction processing, that is, a configuration in which the conveying apparatus 20 that moves on the movement path R on one side in the depth direction Y with respect to the storage rack 10 executes the above-described correction processing with the storage position of the article W closest to the one side in the depth direction Y of the storage section 12 as the first storage position P1, and the conveying apparatus 20 that moves on the movement path R on the other side in the depth direction Y with respect to the storage rack 10 executes the above-described correction processing with the storage position of the article W closest to the other side in the depth direction Y of the storage section 12 as the first storage position P1.

(9) In the above-described embodiment, an exemplary configuration was described in which each of multiple storage sections 12 can store two articles W aligned in the depth direction Y. However, there is no limitation to this kind of configuration, and each of the multiple storage sections 12 may be able to store three or more articles W aligned in the depth direction Y.

(10) In the above-described embodiment, an exemplary configuration was described in which multiple storage sections 12 aligned in the conveying direction X are formed on one support rack 11 that is provided so as to span between the pair of support column sets aligned in the conveying direction X. However, there is no limitation to this kind of configuration, and it is also possible to use a configuration in which only one storage section 12 is formed between the pair of support column sets aligned in the conveying direction X.

(11) In the above-described embodiment, an exemplary configuration was described in which a pair of storage racks 10 are installed so as to oppose each other in the depth direction Y with the movement path R interposed therebetween. However, there is no limitation to this kind of configuration, and it is also possible to use a configuration in which the storage rack 10 is installed only on one side in the depth direction Y with respect to the movement path R.

(12) Note that the configurations disclosed in the above-described embodiments can also be applied in combination with the configurations disclosed in the other embodiments (includes a combination of embodiments described as the other embodiments), as long as no discrepancy occurs. For the other configurations as well, the embodiments disclosed in the present specification are in all respects merely simple examples. Accordingly, various modifications can be performed as appropriate without departing from the gist of the present disclosure.

Overview of Above-Described Embodiment

Hereinafter, an overview of the article storage facility described above will be described.

An article storage facility includes: a storage rack including a plurality of storage sections aligned along a conveying direction along a horizontal plane; a conveying apparatus configured to move in the conveying direction on a movement path along a front surface of the storage rack and to convey an article to one of the storage sections or from one of the storage sections; and a control apparatus configured to control an operation of the conveying apparatus, wherein each of the plurality of storage sections can store a plurality of articles aligned in a depth direction perpendicular to the conveying direction in plan view, a storage position of an article on a side nearest to the movement path in the depth direction in each of the plurality of storage sections is a first storage position, and an amount of time that has elapsed since an article was stored at the first storage position or an amount of positional misalignment from a reference position of the article stored at the first storage position is a monitoring target amount, the control apparatus monitors the monitoring target amount for each of the plurality of storage sections and causes the conveying apparatus to execute correction processing with the storage section in which the monitoring target amount exceeds a set threshold as a target storage section, and the correction processing is processing for correcting a position of only the article stored at the first storage position in the target storage section to the reference position.

According to this configuration, the control apparatus monitors the monitoring target amount for each of the multiple storage sections and causes the conveying apparatus to execute correction processing with a storage section in which the monitoring target amount has exceeded the set threshold as a target storage section, and therefore it is possible to suitably select the storage section to undergo correction processing based on the monitoring target amount. That is, if the amount of time that has elapsed since an article was stored at a first storage position is used as the monitoring target amount, in view of the fact that positional misalignment of the articles due to shaking or the like of the storage rack accumulates more significantly as the amount of elapsed time increases, based on the length of the amount of elapsed time, it is possible to select a storage section with an article having an amount of positional misalignment from a reference position that may be significant enough to require correction processing. Also, if the amount of positional misalignment from a reference position of an article stored at the first storage position is used as the monitoring target amount, it is possible to select a storage section that requires correction processing based on the size of the amount of positional misalignment of the article from the reference position.

Moreover, according to the above-described configuration, the correction processing is processing for correcting the position of only a target article stored at a first storage position in a target storage section to a reference position. In a state in which an article (hereinafter referred to as "first article") is stored at a first storage position, in order to correct the storage position of an article (hereinafter referred to as "second article") at a storage position on a side (opposite movement path side) opposite to the movement path in the depth direction with respect to the first storage position, it is necessary to perform additional processing for removing the first article from the storage section, temporarily moving it to another location (e.g., another storage section, etc.), and returning the first article to the original storage section after the end of the processing for correcting the position of the second article. In contrast to this, the article that is to be subjected to the correction processing as described above is limited to an article stored at the first storage position, whereby it is possible to achieve a configuration in which correction processing that requires the above-described additional processing is not performed. For this reason, it is possible to achieve shortening of the amount of time for which the processing for conveying an article to or from the storage section is interrupted by the correction processing, and it is possible to achieve suppression of a decrease in the processing efficiency of the article conveying processing due to the correction processing being performed.

Note that position misalignment with respect to the reference position at each storage position due to shaking or the like of the storage rack can occur not only on the article stored at the first storage position but also on the article stored at the storage position on the opposite movement path side with respect to the first storage position. However, by correcting the position of the article stored at the first storage position, it is possible to essentially avoid contact between the articles stored in the storage sections and the conveying apparatus that moves on the movement path by correcting the positions of the articles stored at the first storage position.

As described above, according to the above-described configuration, it is possible to realize an article storage facility that can suppress a decrease in the processing efficiency of the article conveying processing due to the position of the articles stored in the storage section being corrected in the case where multiple articles are stored in a storage section in a state of being aligned in the depth direction of a rack.

Here, it is preferable that the conveying apparatus includes a transfer apparatus configured to transfer an article between the conveying apparatus and one of the storage sections, each of the plurality of storage sections includes a support surface that supports an article from below, and the transfer apparatus is configured to, when an article is to be transferred between the conveying apparatus and one of the storage sections, slide the article in the depth direction on the support surface.

With this kind of configuration, due to an article to be transferred sliding on the support surface when an article is to be transferred between the conveying apparatus and a storage section, the storage rack vibrates, and thus an article stored in another storage section may move. Also, although there is a risk that the amount of positional misalignment of the article will increase when positional misalignment caused by this kind of vibration accumulates, as described above, for a storage section in which the monitoring target amount exceeds a set threshold, the position of the article stored at the first storage position is corrected to the reference position due to the correction processing being executed by the conveying apparatus. Accordingly, even if a configuration is used in which an article stored in another storage section may move when an article is thus transferred between the conveying apparatus and a storage section, contact between the article stored in the storage section and the conveying apparatus that moves on the movement path can essentially be avoided.

Also, it is preferable that the conveying apparatus includes a transfer apparatus configured to transfer an article between the conveying apparatus and one of the storage sections, a storage position of an article on a side farthest from the movement path in the depth direction of each of the plurality of storage sections is a second storage position, each of the plurality of storage sections includes a restricting body that restricts movement of an article stored at the second storage position to an opposite movement path side, which is a side opposite to the movement path in the depth direction, by coming into contact with the article from the opposite movement path side, and the transfer apparatus can transfer an article that is in contact with the restricting body at the second storage position to the conveying apparatus.

According to this configuration, the restricting body can suppress a case in which the position of the article stored at the second storage position shifts to the opposite movement path side to the extent that transfer to the conveying apparatus by the transfer apparatus is no longer possible. Accordingly, even if the article stored at the second storage position is not subjected to the correction processing, no significant problem is likely to occur.

Also, it is preferable that the movement path is formed by a rail coupled to the storage rack, and the conveying apparatus includes a wheel that rotates in contact with the rail.

With this kind of configuration, the vibration that occurs in the rail accompanying the movement of the conveying apparatus is transmitted to the storage rack to which the rail is coupled. For this reason, depending on the magnitude of the vibration transmitted to the storage rack, an article stored in a storage section (in particular, an article stored at a first storage position that is closest to a movement path) may move due to the vibration. Also, although there is a risk that the amount of positional misalignment of the article will increase when positional misalignment caused by this kind of vibration accumulates, as described above, for a storage section in which the monitoring target amount exceeds a set threshold, the position of the article stored at the first storage position is corrected to the reference position due to the correction processing being executed by the conveying apparatus. Accordingly, even if a configuration is used in which vibration that occurs in the rail accompanying the movement of the conveying apparatus is thus transmitted to the storage rack, contact between the article stored in the storage section and the conveying apparatus that moves on the movement path can essentially be avoided.

Also, it is preferable that the control apparatus includes a first control unit and a second control unit, the first control unit outputs a conveying instruction to convey an article to or from one of the storage sections to the second control unit, the second control unit instructs the conveying apparatus to execute conveying processing according to the conveying instruction and instructs the conveying apparatus to execute the correction processing, and the second control unit instructs the conveying apparatus to execute one instance of the correction processing that has not been processed, under a condition that no unprocessed conveying instruction exists, the conveying apparatus is not executing the conveying processing, and the conveying apparatus is not executing the correction processing.

According to this configuration, the conditions for the second control unit to instruct the conveying apparatus to execute one instance of unprocessed correction processing include the condition that the conveying apparatus is not executing conveying processing or correction processing, as well as the condition that no unprocessed conveying instruction exists, and therefore by executing the processing for conveying the article to or from the storage section with priority, it is possible to achieve an improvement in the processing efficiency of the article conveying processing, and it is possible to execute the correction processing using the free time during which the article conveying processing is not executed.

Also, according to the above-described configuration, the second control unit instructs the conveying apparatus to execute one instance of unprocessed correction processing when the conveying apparatus is instructed to execute the correction processing, and therefore if the conveying instruction is output from the first control unit while the correction processing is being executed, the conveying processing corresponding to the conveying instruction can be started after the end of the execution of the one correction process. Unlike this kind of configuration, if a configuration is used in which the second control unit instructs the conveying apparatus to collectively execute multiple instances of unprocessed correction processing when multiple instances of unprocessed correction processing exist, the start timing of the conveying processing corresponding to the conveying instruction in the case where a conveying instruction is output from a first control unit during execution of the correction processing is after the end of all of the correction processing instructed to the conveying apparatus, and thus the amount of time from the output of the conveying instruction to the start of the conveying processing increases in some cases. In contrast to this, according to the above-described configuration, if a conveying instruction is output from the first control unit during execution of the correction processing, the conveying processing corresponding to the conveying instruction can be started after the end of the execution of the one correction process, and therefore it is possible to suppress a case in which the amount of time from the output of the conveying instruction to the start of the conveying processing increases, whereby it is possible to achieve an improvement in the processing efficiency of the article conveying processing.

Also, it is preferable that the monitoring target amount is an amount of time that has elapsed since an article was stored at the first storage position, and if the monitoring target amount exceeds the threshold, the control apparatus causes the conveying apparatus to execute the correction processing regardless of the amount of positional misalignment from the reference position of the article stored at the first storage position of the target storage section.

According to this configuration, it is not necessary to monitor the amount of positional misalignment from the reference position of the article stored at the first storage position, and therefore the storage section that is to undergo correction processing can be selected using a low-cost and simple configuration.

Also, it is preferable that the monitoring target amount is an amount of positional misalignment from the reference position of an article stored at the first storage position, the conveying apparatus includes a presence sensor configured to detect whether or not an object exists at the first storage position using a method according to which information on the distance to the object can be acquired, and based on detection information of the presence sensor, the control apparatus acquires the amount of positional misalignment from the reference position of an article stored at the first storage position.

According to this configuration, no sensor for detecting the amount of positional misalignment from the reference position of the article stored at the first storage position is provided in the storage rack, and the presence sensor included in the conveying apparatus can be used to acquire the amount of positional misalignment from the reference position of the article stored at the first storage position. Also, the storage section that is to undergo correction processing can be selected based on the size of the amount of positional misalignment from the reference position of the article stored at the first storage position, and therefore it is easier to avoid a case in which a storage section that does not actually require correction processing is chosen as a target of correction processing. Accordingly, it is possible to suppress a case in which the number of instances of correction processing to be executed increases to more than necessary, and as a result, it is possible to even further suppress a decrease in the processing efficiency of the article conveying processing due to the correction processing being executed.

The article storage facility according to the present disclosure need only be able to exhibit at least one of the above-described effects.

What is claimed is:

1. An article storage facility comprising:
   a storage rack including a plurality of storage sections aligned along a conveying direction along a horizontal plane;
   a conveying apparatus configured to move in the conveying direction on a movement path along a front surface of the storage rack and to convey an article to one of the storage sections or from one of the storage sections; and
   a control apparatus configured to control an operation of the conveying apparatus,
   wherein:
   each of the plurality of storage sections can store a plurality of articles aligned in a depth direction perpendicular to the conveying direction in plan view,
   a storage position of an article on a side nearest to the movement path in the depth direction in each of the plurality of storage sections is a first storage position, and an amount of time that has elapsed since an article was stored at the first storage position or an amount of positional misalignment from a reference position of the article stored at the first storage position is a monitoring target amount,
   the control apparatus monitors the monitoring target amount for each of the plurality of storage sections and causes the conveying apparatus to execute correction processing with the storage section in which the monitoring target amount exceeds a set threshold as a target storage section, and
   the correction processing is processing for correcting a position of only the article stored at the first storage position in the target storage section to the reference position.

2. The article storage facility according to claim 1, wherein:
   the conveying apparatus includes a transfer apparatus configured to transfer an article between the conveying apparatus and one of the storage sections, each of the plurality of storage sections includes a support surface that supports an article from below, and the transfer apparatus is configured to, when an article is to be transferred between the conveying apparatus and one of the storage sections, slide the article in the depth direction on the support surface.

3. The article storage facility according to claim 1, wherein:

the conveying apparatus includes a transfer apparatus configured to transfer an article between the conveying apparatus and one of the storage sections, a storage position of an article on a side farthest from the movement path in the depth direction of each of the plurality of storage sections is a second storage position, each of the plurality of storage sections includes a restricting body that restricts movement of an article stored at the second storage position to an opposite movement path side, which is a side opposite to the movement path in the depth direction, by coming into contact with the article from the opposite movement path side, and the transfer apparatus can transfer an article that is in contact with the restricting body at the second storage position to the conveying apparatus.

4. The article storage facility according to claim 1, wherein the movement path is formed by a rail coupled to the storage rack, and wherein the conveying apparatus includes a wheel that rotates in contact with the rail.

5. The article storage facility according to claim 1, wherein:

the control apparatus includes a first control unit and a second control unit, the first control unit outputs a conveying instruction to convey an article to or from one of the storage sections to the second control unit, the second control unit instructs the conveying apparatus to execute conveying processing according to the conveying instruction and instructs the conveying apparatus to execute the correction processing, and the second control unit instructs the conveying apparatus to execute one instance of the correction processing that has not been processed, under a condition that no unprocessed conveying instruction exists, the conveying apparatus is not executing the conveying processing, and the conveying apparatus is not executing the correction processing.

6. The article storage facility according to claim 1, wherein the monitoring target amount is an amount of time that has elapsed since an article was stored at the first storage position, and wherein if the monitoring target amount exceeds the threshold, the control apparatus causes the conveying apparatus to execute the correction processing regardless of the amount of positional misalignment from the reference position of the article stored at the first storage position of the target storage section.

7. The article storage facility according to claim 1, wherein:

the monitoring target amount is an amount of positional misalignment from the reference position of an article stored at the first storage position, the conveying apparatus includes a presence sensor configured to detect whether or not an object exists at the first storage position using a method according to which information on the distance to the object can be acquired, and based on detection information of the presence sensor, the control apparatus acquires the amount of positional misalignment from the reference position of an article stored at the first storage position.

* * * * *